(12) United States Patent
Kleine et al.

(10) Patent No.: US 6,712,163 B2
(45) Date of Patent: Mar. 30, 2004

(54) ROCK DRILLING TOOL

(75) Inventors: Werner Kleine, Achim (DE);
Hans-Werner Bongers-Ambrosius, Munich (DE); Udo Hauptmann, Landsberg/Lech (DE); Martin Richter, Freising (DE)

(73) Assignee: Hilti Aktiengesellschaft, Schaan (LI)

( * ) Notice: Subject to any disclaimer, the term of this patent is extended or adjusted under 35 U.S.C. 154(b) by 4 days.

(21) Appl. No.: 10/050,222

(22) Filed: Jan. 16, 2002

(65) Prior Publication Data

US 2002/0121391 A1 Sep. 5, 2002

(30) Foreign Application Priority Data

Jan. 19, 2001 (DE) .......................................... 101 02 308

(51) Int. Cl.$^7$ ............................................... E21B 10/38
(52) U.S. Cl. ........................................ 175/320; 175/417
(58) Field of Search ................................. 175/320, 414, 175/415, 417

(56) References Cited

U.S. PATENT DOCUMENTS 5,462,130 A * 10/1995 Peetz .......................... 175/323
6,102,141 A * 8/2000 Engstrom et al. ........... 175/417

* cited by examiner

Primary Examiner—William Neuder
(74) Attorney, Agent, or Firm—Sidley Austin Brown & Wood, LLP

(57) ABSTRACT

A rock drilling tool including a tip (3) formed of a hard material and provided at one end of the tool stem and a shank (4) provided at an opposite end of the stem (2) and having a plurality of entrain grooves (5) extending up to a free end surface of the shank (4), with an entire recessed surface (11) of an entrain groove (5) being larger than an entire outer surface (10) of a groove-forming rest web (6), and with a mean rest cross-sectional area (A'), which is measured within an axial section of the drilling tool having a length at least equal to a product of a natural logarithm base and a stem diameter (e×D), deviating from a mean rest cross sectional area (A) along the entire tool length maximum by 20%.

10 Claims, 1 Drawing Sheet

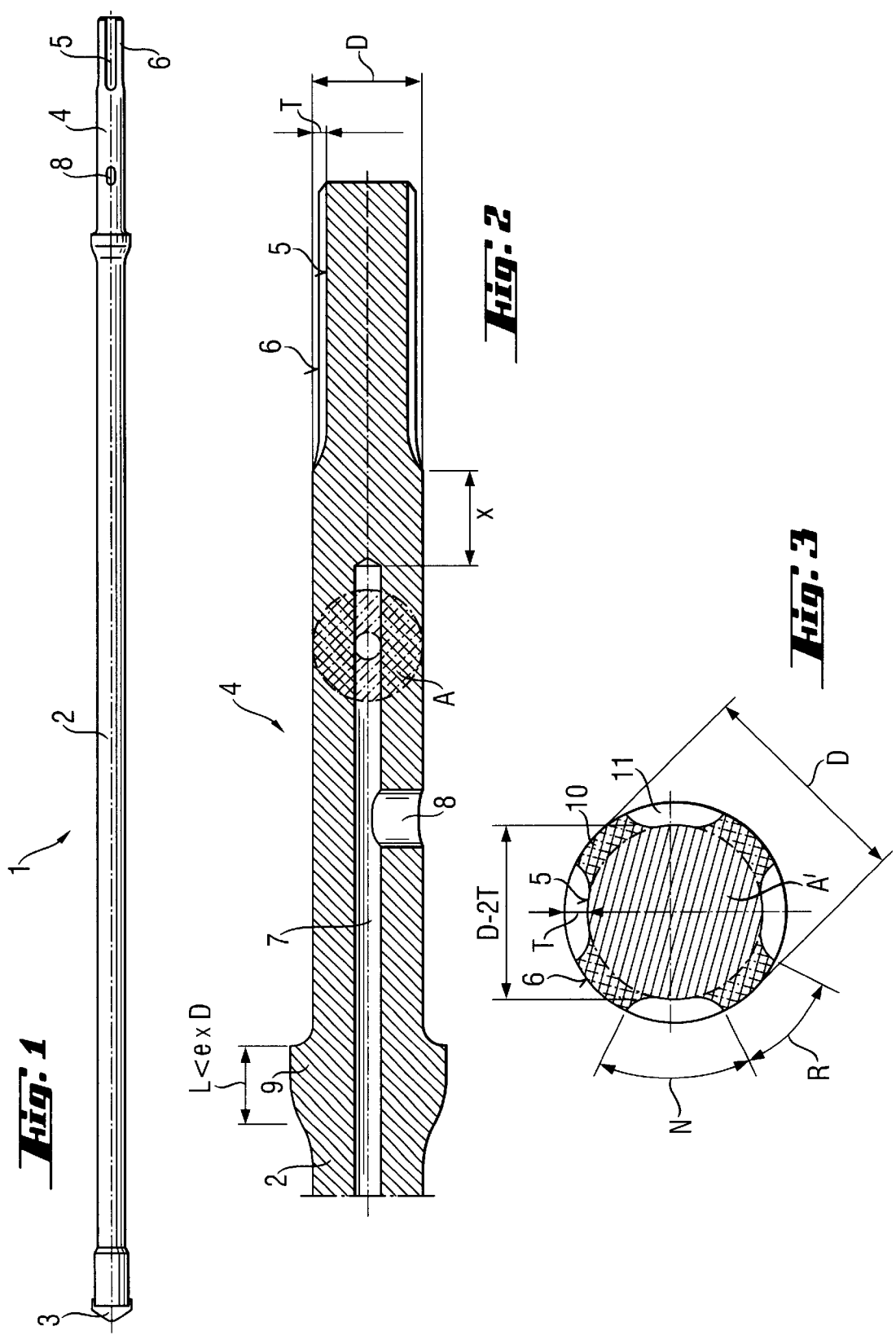

ROCK DRILLING TOOL

BACKGROUND OF THE INVENTION

1. Field of the Invention

The present invention relates to a rock drilling tool for use in a high-power rock drill and subjected to a rotary-percussion movement for abrasive removal of a stone-like material, with the drilling tool being provided with a washing fluid bore extending at least along a portion of a longitudinal extent of the drilling tool stem.

2. Description of the Prior Art

A drilling tool of the type discussed above have a diameter from 20 mm to 50 mm and is provided, at its opposite ends, respectively, with a tip formed of a hard material and a shank for securing the drilling tool in a chuck of a rock drill. The washing fluid, which fills the washing fluid bore, is used, on one hand, for cooling the hard material tip and, on the other hand, for removing the cut-off abrasive material that becomes suspended in the washing fluid. The shank is provided with radial entrain grooves extending up to a free end surface of the shank. Upon insertion of the shank in the rock drill chuck, the entrain grooves become engaged with corresponding elements of the chuck, whereby a torque is transmitted to the drilling tool. The shank is secured in the rock drill shank with a possibility of a limited axial displacement of the drilling tool relative to the chuck.

During a drilling operation, short, rapid, mechanical, axial impacts are applied to the free end surface of the chuck, with the impact energy propagating toward the opposite end of the drilling tool as longitudinal pulses in form of impact pulses. The so transmitted impact energy is introduced into the treated material and provides for abrasive removal of the material. The transmission of the impact pulses depends on acoustic characteristics of a body, which is located in the pulse transmission chain, or its geometry, and takes place in accordance with pulse behavior as it is described by a beam theory with reference to a beam-shaped solid body. An impedance adaptation of a section of the drilling tool is necessary for a substantially distortion-free transmission of short, rapid impact pulses.

German Publication DE 24 54 265 discloses a rock drilling tool used with a percussion power tool and capable of transmitting a high torque. The disclosed rock drilling tool has a hard material tip, which is provided at one end of the drilling tool, a helice, and has its radially reinforced, opposite end provided with entrain grooves extending to the end surface of this end and having steep flanks at their rotational direction sides. Between the stem and the shank, which is formed by the entrain groove section, there is provided an axially elongate, radially extending band. As a result, the drilling tool has, along its length, several axially extending sections having different cross-sectional areas.

British Publication GB 2,120,156 discloses a helice-free rock drilling tool which is subjected to a rotary-percussion movement. The disclosed drilling tool has several axially extending sections having different cross-sectional areas and has a washing fluid bore extending through the stem. For transmitting a torque to the drilling tool, the tool has a radially reinforced hexagonal region in the inner section of the shank and has axially limited, locking grooves provided in the end surface of the shank.

European Publication EP-0 048 980 discloses a rock drilling tool having a hard material tip at one of its opposite ends, a shank provided at the other end, and a stem having a helice and a washing fluid bore extending at least partially through the stem. The washing fluid bore is connected with the outside by a transverse bore located adjacent to the shank. The drilling tool has a substantially same cross-sectional area along its entire length.

An object of the present invention is to provide a rock drilling tool having a washing fluid bore and capable of transmitting shorter impact pulses and a higher torque than the conventional rock drilling tools, such as described above.

SUMMARY OF THE INVENTION

This and other objects of the present invention, which will become apparent hereinafter, are achieved by providing a rock drilling tool including a stem having a washing fluid bore extending at least along a portion of a longitudinal extent of the stem, a tip formed of a hard material and provided at one end of the stem and a shank provided at an opposite end of the stem and having a plurality of entrain grooves extending up to a free end surface of the shank, with an entire recessed surface of each entrain groove being larger than an entire outer surface of each of groove-forming rest webs, and with a mean rest cross-sectional area, which is measured within an axial section of the drilling tool having a length at least equal to a product of a natural logarithm base and a stem diameter, deviating from a mean rest cross-sectional area along the entire length of the drilling tool maximum by 20%.

By providing a greater entrain groove surface than the outer surface of a rest web, it become possible to transmit a higher torque upon a engagement of entraining webs of a power tool chuck in the entrain grooves of the rock drilling tool shank, without the entraining webs being subjected to higher stresses than the rest webs of the rock drilling tool shank. The large recessed entrain groove surfaces reduce the rest cross-sectional area of the shank of the cylindrical rock drilling tool which has a substantially smooth outer diameter.

With the washing fluid bore extending over the length of the rock drilling tool including the shank, there is obtained, within a substantially elongate axial portion of the drilling tool with substantially the same relative cross-sectional area ratio, an acoustic impedance adaptation favorable for a reflection-and distortion-free transmission of shorter impact pulses. Elongate sections, the lengths of which are smaller than a product of the tool outer diameter and the natural logarithm base, do not lead to a substantial change in the acoustic impedance. The acoustic impedance adaptation is calculated in accordance with following equations:

$$\frac{A_2}{A_1} = \sqrt{\frac{E_1}{E_2} * \frac{\rho_1}{\rho_2}} \quad \text{and} \quad \frac{L_2}{L_1} \geq \sqrt{\frac{E_2}{E_1} * \frac{\rho_1}{\rho_2}}$$

where $L_1$, $L_2$ are the length and $A_1$, $A_2$ are cross-sectional surface ratios of the stem and the entrain groove region of the shank, E is a respective module of elasticity, ρ-respective thickness, with the index 2 characterizing an impacted body.

Advantageously, the mean cross-sectional area of the stem does not exceed that of the shank, whereby the service life-reducing tensile stress peaks are eliminated in the transition area between the stem and the shank.

Advantageously, the radial engagement depth of the entrain grooves is larger than $\frac{1}{12}$ of the shank outer diameter, which permits advantageously to obtain a flank pressure, i.e. a contact pressure on the side surfaces of the rest webs that is below the flow limit of the material the drilling tool is made of.

Advantageously, the arc length of at least one entrain groove, which is measured in the arithmetical center of the engagement depth is greater than a maximum arc length of a rest web. Thereby, the entraining member, which is engaged in the entrain groove is always subjected to a smaller stress than the rest web of the shank.

For transmitting a maximum torque, the entrain grooves are uniformly distributed over the shank circumference.

Advantageously, the shank of the inventive rock drilling tool is provided with four entrain grooves, so that with a groove arc length greater than $\pi/4$, a greater wear endurance of the entraining elements, which engage in respective grooves, is insured, while maintaining an adequate guidance precision.

Advantageously, the stem is formed as a cylindrical smooth body, which insures a good stability against fatigue stresses resulting from an alternating action of short impact pulses.

Advantageously, the axial distance between the end of the washing fluid bore and the entrain groove region is smaller than product of the natural logarithm base and the stem diameter. As a result, this axial region of the shank does not influence, in any noticeable way, the acoustic impedance. This axial distance, advantageously, is greater than a half of the stem diameter. As a result, only a small diffraction of an axially propagating wave front occurs when the wave front passes from the shank to the stem. Advantageously, a radially extending band, which has a length smaller than the product of the natural logarithm base and the tool diameter, is provided in the transition region between the shank and the stem which becomes overlapped by locking elements of the chuck. The band does not influence in any meaningful way the acoustic adaptation of the rock drilling tool.

Advantageously, the band is provided axially adjacent to the cross-bore that connects the washing fluid bore with the outside or closely to the end of the washing fluid bore. This prevents mechanical weakening of the transition region between the shank and the stem.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

In the Drawings.

FIG. 1 shows a side view of a rock drilling tool according to the present invention;

FIG. 2 shows a cross-sectional view of a shank end of the rock drilling tool shown in FIG. 1; and FIG. 3 shows a cross-sectional view along line 3—3 in FIG. 2.

DETAILED DESCRIPTION OF THE PREFERRED EMBODIMENT

A rock drilling tool according to the present invention, which is shown in the drawings has an elongate, smooth cylindrical stem 2 provided, at one of its end, with a tip 3 formed of a hard material and at its opposite end, with a shank 4 having a plurality of radially engageable, entrain grooves 5 extending up to the free end surface of the shank 4 and having an engagement depth T of about $1/10$ of the outer diameter D of the shank 4.

As shown in FIG. 2, the shank 4 has a plurality of rest webs 6 the number of which corresponds to the number of the entrain grooves 5 and which form the entrain grooves 5. In the embodiment shown in the drawings, the shank 4 of the rock drill 1 has four entrain grooves 5 uniformly distributed over its circumference.

As further shown in FIG. 2, the rock drilling tool has a washing fluid bore 7 which partially extends through the shank 4 and is connected with the outside by a transverse bore 8. An axial distance X between the end of the washing fluid bore 7 and the beginning of the entrain groove region of the shank corresponds substantially to the outer diameter D of the shank 4.

In the transition region between the stem 2 and the shank 4, the stem 2 has a radially extending band 9 having a length L that is smaller than a product of the outer diameter D of the shank 4 and the base e of the natural logarithm, i.e., e×D.

According to the present invention, a mean rest cross-sectional area A' measured within an axial section of the drilling tool having a length at least equal to the product of the natural logarithm base e and the stem diameter D, i.e., e×D, deviates from a mean rest cross-sectional area A measured along the length of the drilling tool 1 maximum by 20%, with the mean rest cross-sectional area A' in the region of the shank 4 being smaller than in the region of the stem 2.

As shown in FIG. 3, a radially engageable, arcuate surface 11, which defines a recessed entrain groove 5, is larger than the entire outer surface 10 of a rest web 6, with the length N of the arc measured in the arithmetic center of the radial engagement depth being larger than $\pi/4$ (in a shank with four entrain groove), and the length R of the outer arc of the rest web 6 being smaller than $\pi/4$ i.e., N>$\pi/4$ RAD and R<$\pi/4$ RAD.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A rock drilling tool, comprising a stem (2) having a washing fluid bore (7) extending at least along a portion of a longitudinal extend of the stem (2); a tip (3) formed of a hard material and provided at one end of the stem (2); and a shank (4) provided at an opposite end of the stem (2) and having a plurality of entrain grooves (5) extending up to a free end surface of the shank (4), an entire cross-sectional recessed surface (11) of each entrain groove (5) being larger than an entire cross-sectional outer surface (10) of each of groove-forming rest webs (6), and a mean rest cross-sectional area (A'), which is measured within an axial section of the drilling tool having a length at least equal to a product of a natural logarithm base and a stem diameter (e×D), deviating from a mean rest cross-sectional area (A) along the entire length of the drilling tool (1) maximum by 20%.

2. A rock drilling tool according to claim 1, wherein the mean rest cross-sectional area (A') in the region of the shank (4) is at most equal to the mean cross-sectional area (A') of the stem (2).

3. A rock drilling tool according to claim 1, wherein a length (N) of an arc of at least one entrain groove (5), which is measured in an arithmetic center of a radial engagement depth (T), of the groove, is greater than a maximum length (R) of an arc of a rest web (6).

4. A rock drilling tool according to claim 1, wherein the entrain grooves (5) are uniformly arranged over a shank circumference.

5. A rock drilling tool according to claim 1, wherein the plurality of entrain grooves (5) consists of four grooves.

6. A rock drilling tool according to claim 1, wherein the stem (2) is formed as a cylindrical smooth body.

7. A rock drilling tool according to claim 1, wherein an end of the washing fluid bore (7) is spaced from the entrain grooves (5) by a distance (x) smaller than the product of the natural logarithm base and the stem diameter (e×D).

8. A rock drilling tool according to claim 7, wherein the distance (x) between the end of the washing fluid bore (7) and the entrain grooves (5) is longer than half of the stem diameter (D).

9. A rock drilling tool according to claim 1, further comprising a radially extending band (9) provided in a transition region between the stem (2) and the shank (4).

10. A rock drilling tool according to claim 9, wherein the band (9) is located adjacent to one of a transverse bore (8) connecting the washing fluid bore (7) with outside, and an end of the washing fluid bore.

\* \* \* \* \*